United States Patent
Van Den Berg

(10) Patent No.: US 8,438,991 B2
(45) Date of Patent: May 14, 2013

(54) SYSTEM FOR CONNECTING A TEAT CUP TO A TEAT

(75) Inventor: Karel Van Den Berg, Bleskensgraaf (NL)

(73) Assignee: Lely Patent N.V., Maassluis (NL)

( * ) Notice: Subject to any disclaimer, the term of this patent is extended or adjusted under 35 U.S.C. 154(b) by 156 days.

(21) Appl. No.: 13/160,595

(22) Filed: Jun. 15, 2011

(65) Prior Publication Data

US 2011/0239945 A1 Oct. 6, 2011

Related U.S. Application Data

(63) Continuation of application No. PCT/NL2009/000229, filed on Nov. 19, 2009.

(51) Int. Cl.
*A01J 5/017* (2006.01)

(52) U.S. Cl.
USPC ..................... 119/14.02; 119/14.47

(58) Field of Classification Search ............... 119/14.02, 119/14.03, 14.08, 14.47
See application file for complete search history.

(56) References Cited

U.S. PATENT DOCUMENTS

| | | | |
|---|---|---|---|
| 4,223,635 A | 9/1980 | Akerman | |
| 4,805,557 A * | 2/1989 | van der Lely et al. | 119/14.08 |
| 4,867,103 A | 9/1989 | Montalescot et al. | |
| 5,979,359 A * | 11/1999 | Hansson | 119/14.08 |
| 6,118,118 A * | 9/2000 | van der Lely et al. | 250/221 |
| 6,167,839 B1 * | 1/2001 | Isaksson et al. | 119/14.08 |
| 7,490,576 B2 * | 2/2009 | Metcalfe et al. | 119/14.08 |
| 7,568,447 B2 * | 8/2009 | Peacock | 119/14.08 |
| 7,895,972 B2 * | 3/2011 | Gudmundsson et al. | 119/14.1 |
| 7,984,693 B2 * | 7/2011 | Mader et al. | 119/14.08 |
| 8,045,763 B2 * | 10/2011 | Hallstrom et al. | 382/110 |
| 8,286,583 B2 * | 10/2012 | Van Den Berg | 119/14.02 |

FOREIGN PATENT DOCUMENTS

| | | |
|---|---|---|
| DE | 202005015210 U1 | 3/2006 |
| EP | 232568 A | 8/1987 |
| EP | 1 537 775 A1 | 6/2005 |
| EP | 1933168 A | 6/2008 |
| JP | 06194454 A | 7/1994 |
| NL | 9100870 A | 12/1992 |
| WO | 2007/050012 A1 | 5/2007 |
| WO | 2008/030086 A1 | 3/2008 |

OTHER PUBLICATIONS

ISR and Written Opinion of PCT/NL2009/000229 issued Mar. 18, 2010 by the EPO.
NL search report issued Jun. 17, 2009 by the EPO.

* cited by examiner

*Primary Examiner* — Yvonne Abbott
(74) *Attorney, Agent, or Firm* — Coraline J. Haitjema; David P. Owen; Hoyng Monegier LLP

(57) ABSTRACT

The invention provides a system for connecting a teat cup to a teat, including a teat cup with an opening for receiving a teat, a robot arm for moving the teat cup, a teat cup positioning system with a 3D-sensor and a sensor device for measuring a control quantity, and for connecting the teat cup under the control of the 3D-camera and the control quantity. The sensor device includes at least two electrodes around the opening and a capacitive sensor configured to measure a quantity connected with the capacitance between the electrodes, in particular the capacitance between two electrodes. This system provides a reliable positioning with respect to a teat by, for example, maximization of the measured capacitance. The positioning system supports an optical 3D-sensor for the first, global positioning.

20 Claims, 2 Drawing Sheets

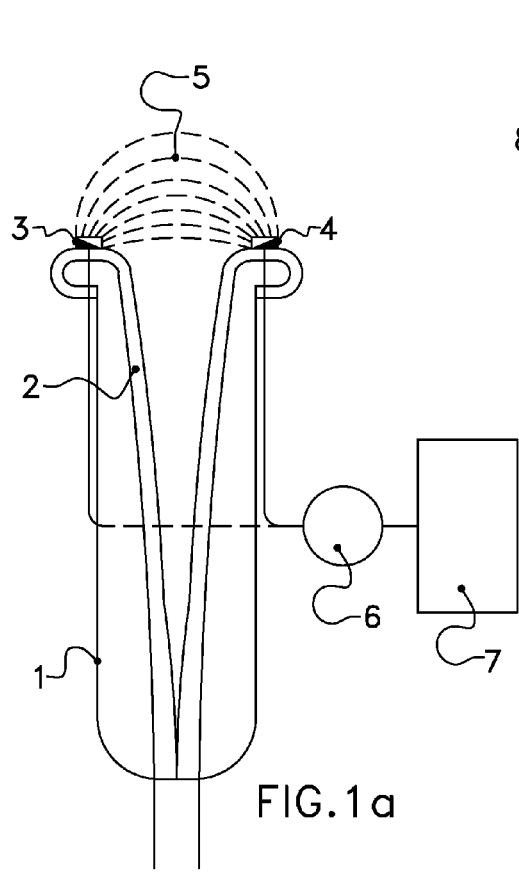
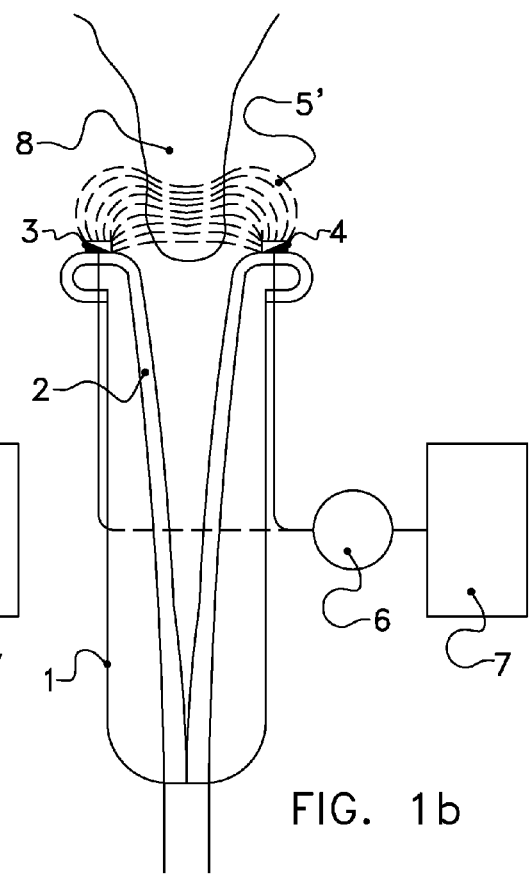
FIG. 1a    FIG. 1b
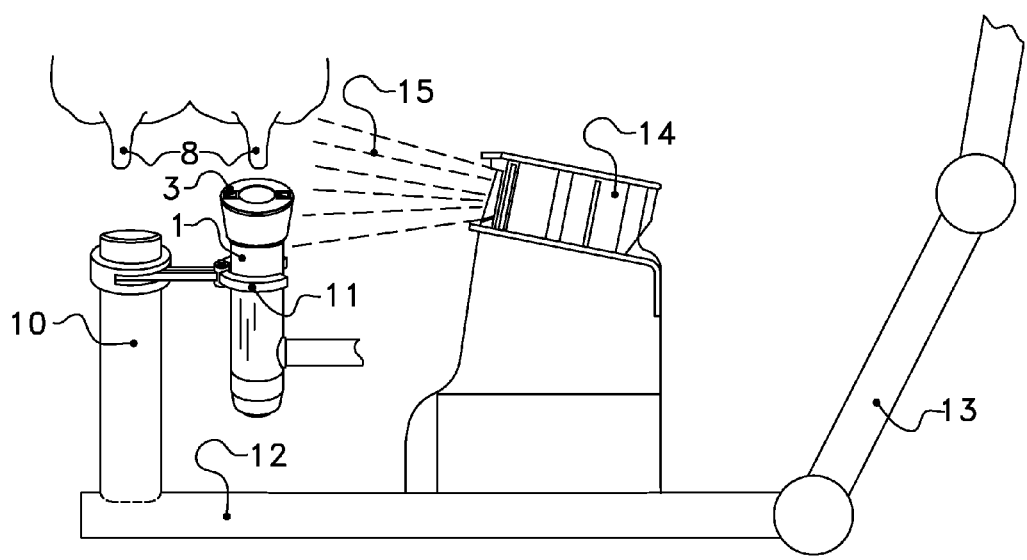
FIG. 2

SYSTEM FOR CONNECTING A TEAT CUP TO A TEAT

CROSS REFERENCE TO RELATED APPLICATIONS

This application is a continuation of PCT application number PCT/NL2009/000229 filed on 19 Nov. 2009, which claims priority from Netherlands application number NL 1036328, filed on 18 Dec. 2008. Both applications are hereby incorporated in their entireties.

BACKGROUND OF THE INVENTION

1. Field of the Invention

The invention relates to a system for connecting a teat cup to a teat, in particular according to the preamble of claim 1, and comprising: at least one teat cup with an opening for receiving a teat, a robot arm, which is configured to move the teat cup, and a teat cup positioning system with an optical 3D-sensor, which teat cup positioning system is configured to control the robot arm to connect the teat cup under the control of the optical 3D-sensor.

2. Description of the Related Art

Document U.S.2007215052, which is hereby incorporated by reference in its entirety, discloses a system, in so-called milking robots, which is able to connect autonomously one or more teat cups to a corresponding number of teats, based on information from an image that has been obtained by means of an optical time-of-flight-camera.

A problem with such systems is the reliability of connecting the teat cup, because this is of major importance to highly efficient automatic milking as a whole. A particular drawback with known systems relates to the reliability of estimating the relative position of the teat cup with respect to the teat to which it is to be connected. Although it is possible for a 3D-sensor to determine, in principle, the mutual positions of different objects, such as teats, teat cups and the udder, on the basis of the measured distances, in common practice the accuracy is frequently found to be insufficient for a highly reliable connection, and shows, for example, a deviation or dispersion up to a few centimeters.

BRIEF SUMMARY OF THE INVENTION

It is an object of the invention to provide a system of the type mentioned in the preamble which has a higher reliability of connecting.

For this purpose, the invention provides a system wherein the teat cup positioning device additionally comprises a sensor device for measuring a control quantity and is configured to control the robot arm to connect the teat cup under the control of the control quantity measured by the sensor device, wherein the sensor device comprises at least two electrodes and a capacitive sensor, wherein the electrodes are provided around the opening, and the capacitive sensor is configured to measure as the control quantity a quantity connected with the capacitance between the electrodes. According to the invention, the control is performed by both the 3D-sensor and the (additional) sensor device, the latter based on a capacitive measurement. Here, there is made use of the circumstance that current 3D-sensors, which are available on the market, show in general a deviation of a few centimetres, which is undesirable when connecting, whereas the capacitive (additional) sensor device, while having a small working range in practice, will be able to control the last centimetres of the positioning in a highly accurate manner. Therefore, the control will advantageously take place in a stepwise manner, wherein the initial positioning will take place under the control of only the 3D-sensor, whereas it will be possible for the final fine-positioning to take place under the control of the capacitive sensor device.

In particular, the capacitive sensor is configured to measure the capacitance between two electrodes. According to the invention, a quantity connected with the capacitance between the electrodes, and in particular the capacitance between two electrodes, is measured as the control quantity. The insight to come to this invention is connected with the idea that this quantity changes when a teat comes into the direct environment of the sensors, and will change the most when the teat is located in the centre between the sensors. In particular the capacitance between two sensors will change by bringing therebetween water-containing and conductive tissue, such as a teat. The effect is imaginable by considering the teat as a dielectricum between the sensors, which serve in that case as capacitor plates. As a direct and proper position relation between teat and sensors becomes possible in the abovementioned manner, it will be possible to achieve a high reliability of connecting if said sensors are efficiently positioned. In addition to capacitance, another quantity could be measured as well, such as an electric field intensity at an applied voltage between the electrodes, a resistance therebetween, etcetera. By "capacitive sensor" is meant in this case a "sensor for measuring a capacitance or quantity connected therewith", and not necessarily a sensor that is linked in a capacitive manner to a circuit or the like.

It is pointed out here that, in this context, by "teat cup" is not only meant a cup for milking, but also a foremilking cup, cleaning cup, disinfecting cup or other cup that is connected to a teat.

In embodiments, the electrodes are disposed on an upper edge of the teat cup, in particular on an upper edge of a liner in the teat cup. This is a favourable position, in the centre between the relevant parts of the positioning process, namely the teat tip and the upper edge of the teat cup. By upper edge of the teat cup are meant in particular those parts of the teat cup that are visible in a top view. However, more in general, the upper edge also comprises here the upper part, i.e. the upper 5 cm, of the outside of the teat cup itself, as being sufficiently close to the relevant parts. In principle, when being positioned on a plane in the centre between the two sensors, the teat tip will produce the greatest change of the quantity. When positioning, for example, it is possible first to search an extreme value of the quantity in a first direction, and subsequently to search an extreme value in another direction, preferably at right angles thereto.

The electrodes may be provided on the teat cup or the teat cup liner, for example by means of glue. Advantageously, the electrodes may also be provided by casting or by otherwise enveloping with material. This protects the electrodes very well from external influences, such as short-circuit by moisture, or corrosion and the like, while it has hardly any effect on the measurement of the electric quantity such as capacitance. It is also possible to glue the electrodes or to provide them otherwise on the teat cup or teat cup liner, and to cover them subsequently with a protective layer, in order to achieve a comparable effect.

The electrodes may, for example, be designed as square or rectangular plates, but also as, for example, a part of a ring, such as half a ring. In the latter case, it is still possible for two electrodes to cover substantially the entire circumference around the opening of the teat cup.

In one embodiment, there are provided more than two electrodes, wherein the sensor device is configured to select manually or automatically a pair of electrodes to measure the electric quantity therebetween. It should be noted that, in this application, the sensor device, at any rate at least the system as a whole, is provided with a control device which is configured to process the signals from the electrodes into a value for the electric quantity. In the embodiment mentioned here the sensor device, at least the control device, is suitable for selecting electrodes. It is thus possible to measure the electric quantity for a plurality of pairs of selected electrodes successively, or, if there are at least four electrodes, also simultaneously. The sensor device is then preferably configured to determine a teat position from the various measured values, for example from interpolation of different measurements. Advantageously, there are provided a large number of, for example, at least 6, and preferably 10 or more electrodes, of which at least two electrodes are capable of being mutually electrically coupled to form one single electrode. There is thus formed an electrode with a larger surface and a higher sensitivity, which results in a more accurate measurement. In one embodiment, the system is configured to couple the electrodes electrically to form two groups of immediate neighbours, which results in a much more sensitive system. Such a setting is in particular suitable for the global measurement in the beginning, in which case, of course, the distance is greater and the signal is weaker. If the measured signal exceeds a specific upper limit, the electrodes can be subdivided in order thus to enable a more precise measurement. The system is then advantageously configured to couple the electrodes, and to uncouple them if the measured electric quantity exceeds a specific upper limit.

In particular, the sensor device comprises a plurality of pairs of electrodes, wherein the electrodes of each pair are disposed in each case opposite one another around the opening, wherein the capacitive sensor is configured to measure a quantity connected with the capacitance between each pair of electrodes, in particular the capacitance between that pair of electrodes. If there are a plurality of pairs, a good reliability can be safeguarded even better, because, upon searching an extreme value of the quantity, during positioning of the teat cup, an extreme value can be searched simultaneously in a plurality of directions. There are preferably non-parallel connecting lines between the two electrodes of each pair. In particular, an electrode can form part of a plurality of pairs. This does not only limit the number of components, but also safeguards non-parallel connecting lines.

In another embodiment, the pairs are evenly distributed around the opening, wherein the capacitive sensor is configured to measure the sum of the capacitances between each of the pairs of electrodes. This is a simple but still efficient arrangement to determine a correct position. An example of this arrangement is a ring with the electrodes being evenly distributed. Also here, one or more electrodes can form part of a plurality of pairs.

In a further embodiment, the teat cup positioning system is configured to control the robot arm under the maximization of the measured quantity, in particular of the capacitance. In particular this capacitance will show a maximum as an extreme value if the teat has properly been positioned with respect to the opening, obviously in the case of a suitable arrangement of the electrodes, for example as indicated above.

In yet another embodiment, the system according to the invention further comprises an additional teat detection system. The teat cup positioning system is then advantageously configured to control the robot arm to connect the teat cup under the control of the 3D-sensor, the sensor device and the additional teat detection system. In this manner, optimum use can be made of the advantages of different systems. Many known teat detection systems, such as those based on optical or acoustic sensors, are able to properly recognize the teats of an animal, but are less reliable as regards the positioning of teat cup and teat at the proper distance, i.e. at a proper mutual relative position. On the other hand, the system according to the invention, with the sensors that, for example, measure the capacitance, is less efficient in determining a proper mutual position if the distance is still great, but very appropriate if the distance has already become small. Therefore, a two or more stage control seems to be optimal.

In yet a further embodiment, the system according to the invention additionally comprises one or more of an ultrasonic scanner, an optical sensor and an animal recognition device, advantageously also has a data file containing previous teat positions, which are each able to provide efficient information regarding teat positions, either from acoustic or optical measurements, or from stored information regarding the animal.

According to the invention, the system comprises an optical 3D-sensor. This type of sensor provides high resolution optical images which also comprise distance information that can properly be used to bring the teat cup quickly into a position in which the sensor system according to the invention can function optimally. It should be noted here that optical 3D-sensors are often found not to be very accurate in actual practice, and show, for example, a deviation or dispersion up to a few centimeters. The sensor system according to the invention is able to connect the teat cup in a very reliable and fast manner to the teat, if the teat cup has been brought within a small distance, of for example a few centimeters, from the teat.

BRIEF DESCRIPTION OF THE DRAWINGS

The features and advantages of the invention will be appreciated upon reference to the following drawings, in which:

FIGS. 1a and 1b are two schematic cross-sections of a system according to the invention without and with a teat being present therein, respectively, FIG. 2 is a schematic view of a system according to the invention.

DESCRIPTION OF ILLUSTRATIVE EMBODIMENTS

Figure 3:
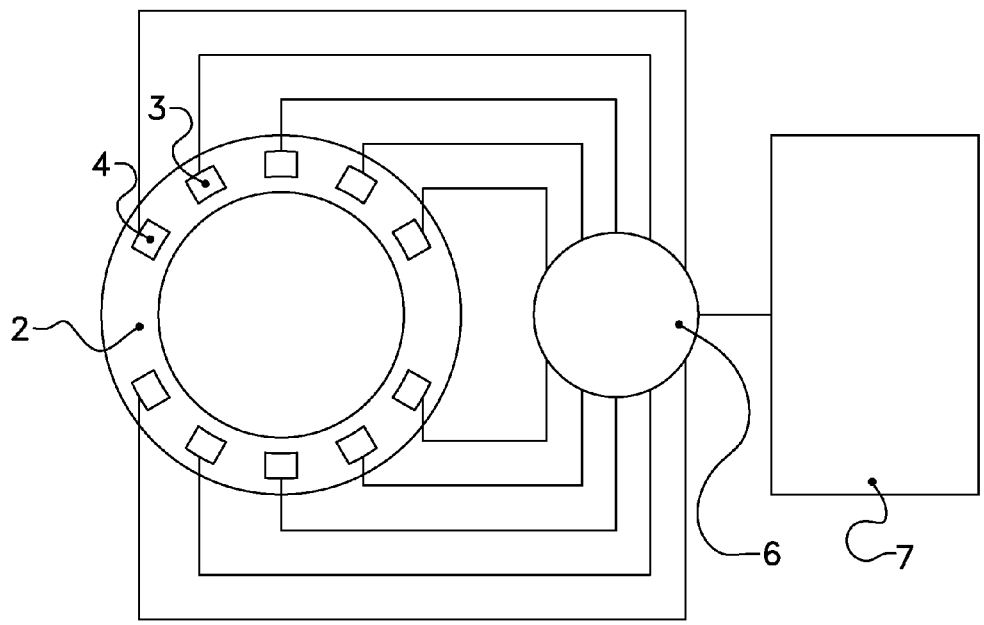
FIG. 3 is a schematic top view of another embodiment of a system according to the invention.

The following is a description of certain embodiments of the invention, given by way of example only and with reference to the drawings. FIGS. 1a and 1b show a cross-section of a system according to the invention without and with a teat being present therein, respectively. The system comprises a milking cup or teat cup 1 with a teat cup liner 2. A first electrode 3 and a second electrode 4, wherebetween there is an electric field 5, are disposed thereon. A sensor is denoted by 6, whereas a control unit is denoted by 7. In FIG. 1b a teat is denoted by 8. It should be noted that, for the sake of clarity, a 3D-sensor is shown neither in FIG. 1, nor in FIGS. 3 and 4. However, it is shown and elucidated with reference to FIG. 2.

FIGS. 1a and 1b show a simple arrangement of the system according to the invention. Here, there are disposed two electrodes 3 and 4 on a teat cup liner 2 of a teat cup, in particular around the opening through which a teat 8 can be received. To the electrodes 3 and 4 there is applied an electric voltage by means of a non-shown voltage source. The voltage produces an electric field 5, the field lines of which are shown schematically.

The sensor 6 measures an electric quantity between the two electrodes 3 and 4. The sensor 6 comprises, for example, a capacitance meter which measures the capacitance between the electrodes 3 and 4. If no further object, in particular a teat 8, is present between the electrodes, the sensor 6 will measure an almost constant, relatively low value for the capacitance. If the teat cup 1 is to be connected to a teat 8, the teat cup 1 will be brought into the vicinity of the teat 8 with the aid of means that are not shown here. For this purpose, an acoustic sensor, or, according to the invention, an optical 3D-sensor can, for example, be used. This is illustrated with respect to FIG. 2. If, in FIG. 1*b*, a teat 8 comes into the vicinity of the teat cup 1 and thus enters the electric field 5, the tissue of the teat 8 will influence said field 5 and, for example, change it into field 5'. The change shown is purely schematically and only intended to indicate that the electric field 5, and in particular the resulting capacitance between the electrodes 3 and 4, will change indeed. This changed capacitance can be recorded by means of the sensor 6.

In general, the situation will be such that the more the capacitance will change, the closer the teat 8 will be located to the teat cup 1, in particular to the electrodes 3 and 4. The change will show an extreme if the teat 8 is located in the centre between the electrodes 3 and 4. With the aid of the control unit 7, the teat cup 1 can then be led to the teat 8 by, for example, maximizing the capacitance. By, for example, locally varying the position of the teat cup 1, in one or more directions, maximization of the capacitance can be achieved in a simple manner. It is thus possible to lead the teat cup 1 to the teat 8 in a reliable manner.

It should be noted here that in the foregoing the electric capacitance between two electrodes 3 and 4 is used. Other electric quantities, such as electric resistance, electric field intensity, etcetera, may also be used. Moreover, the number and position of the electrodes may vary. The electrodes 3 and 4 are shown on the teat cup liner 2. Although this results in a position near the teat 8, this may sometimes be less practical, for example when changing the teat cup liner 2. Although the electrodes 3, 4 when being positioned on the teat cup 1, i.e. on the rigid outer case, are in principle somewhat more remote from the opening than when being positioned on the teat cup liner 2, and said teat cup liner 2 is then usually positioned between the teat 8 and the electrodes 3, 4, the negative effect thereof on the capacitance determination is limited. The number of electrodes and their exact position may vary, and may amount to three, four or more electrodes 3, 4, arranged so as to be preferably evenly distributed over the circumference of the teat cup 1, the teat cup liner 2, respectively.

FIG. 2 is a schematic view of a system according to the invention. Here, corresponding components are denoted by the same reference numerals. There is additionally shown a teat cup positioning device 10 with a gripper 11, on a platform 12 of a robot arm 13. There is furthermore shown an optical 3D-sensor 14 with an image field 15. The capacitance sensor 6 and the control unit 7 for controlling the robot arm 13 and the teat cup positioning device 10 are not shown here. Incidentally, the platform 12 may also be considered as a part of the robot arm 13. Further details of said robot arm 13 are not important for the invention and will, therefore, not be set out in further detail.

The shown system is very suitable for a reliable positioning of the teat cup 1 with respect to a teat 8. In the very first place, i.e. when the distance between teat cup 1 and teat 8 is still great, and capacitance measurement can not yet be used in a proper manner for positioning, the optical sensor 14 can be used. In this case, only the teat 8, and preferably, but not necessarily, also the teat cup 1, has to be positioned in the image field 15 of the optical sensor 14. The optical sensor is, for example, a 3D-sensor which additionally supplies an image that is two-dimensional per se with distance information, and is thus able to provide an image that is three-dimensional as a whole. But, for example, an "ordinary" video camera, or an ultrasonic sensor or the like, in all cases provided with a sort of image recognition, may be used as well. It should be noted here that an ultrasonic sensor also has un inaccuracy which is comparable with that of a customary 3D-sensor. An ordinary video camera has, of course, no depth information at all, and will be inherently inaccurate in this respect. A combination comprising, instead of a 3D-sensor, an ultrasonic sensor or an "ordinary", i.e. 2D, video camera, thus provides in principle the same advantages as the system according to the present claimed invention.

With the aid of the sensor 14, the teat 8 can then be "globally" positioned with respect to the teat cup 1. Subsequently, the measurement with the electrodes 3, 4 and the sensor 6 can be used for an accurate and reliable positioning of the teat cup 1 with respect to the teat 8. A problem of known systems is that the intrinsic accuracy of the optical and other systems used in practice is not very high. This has also to do with the fact that they will also have to be able to function for greater distances (the very first positioning step). By contrast, the system according to the invention starts from the end position, and achieves this by minimizing a deviation therefrom, on the basis of an electric quantity, in particular the capacitance. This results in a very reliable centering and positioning.

It should be noted here that only one teat cup 1 is shown. The robot arm 13 is able to connect the teat cups 1 one by one, after taking them from a storage space. It is also possible to dispose all teat cups 1 on the robot arm 13 and to position them simultaneously under the teats 8. For positioning a teat cup 1 on at least one of the teats 8 it is then possible to use the system according to the invention. For positioning the other teat cups 1 it is possible either to use known or measured teat positions, or, for example, to use for the other teat cups a similar system as that according to the invention.

FIG. 3 shows a schematic top view of another embodiment of the system according to the invention. There is depicted a teat cup liner 2 with ten electrodes disposed thereon. These are divided here into five upper electrodes 3, and five lower electrodes 4. Obviously, "upper" and "lower" relate in this case, for the sake of simplicity, only to the plane of the drawing. In practice, it is, of course, possible to use another division and other numbers of electrodes. All five upper electrodes 3 are mutually arbitrarily electrically connectable, so that the sensor 6 can use one to five parallel upper electrodes 3 for the measurements. Likewise, the five lower electrodes 4 are mutually arbitrarily electrically connectable. As mentioned above, by selecting another division of "lower" and "upper", any arbitrary constellation can be achieved. Selection of the electrodes 3, 4, as well as electric coupling and uncoupling takes place under the control of the control unit 7. This coupling can, for example, take place at the initial measurement, in which case the distance to the teat will still be great, and consequently a sensitive measurement will be required. When the teat comes closer, on the other hand, a more precise measurement will be required, which need not be highly sensitive, for which purpose the electrodes 3, 4 are capable of being mutually uncoupled electrically.

Figure 4:
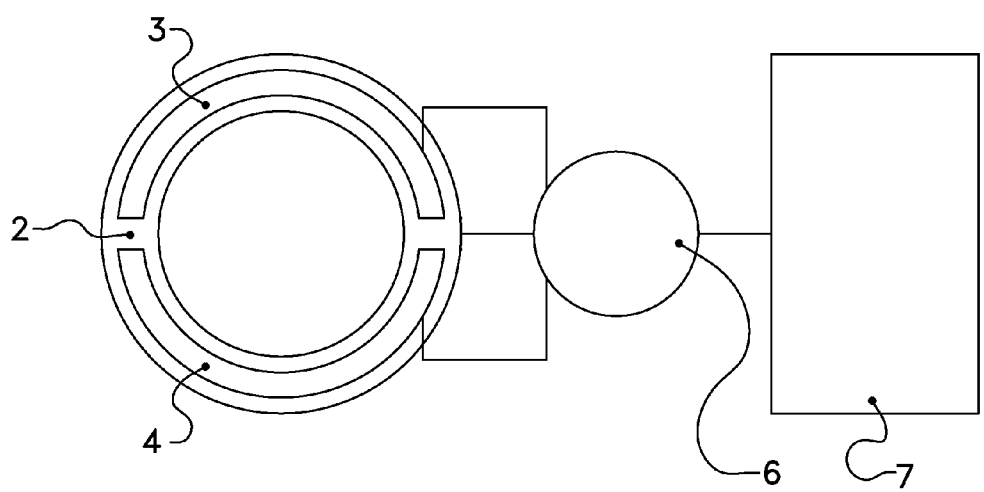
FIG. 4 is a schematic top view of still another embodiment of the system according to the invention.

FIG. 4 shows a schematic top view of still another embodiment of the system according to the invention. Here again, a teat cup liner 2 is shown with disposed thereon two electrodes 3 and 4, which are each semi-annular. They thus cover the opening of the teat cup liner 2 almost completely and with a high sensitivity. There may also be provided a plurality of electrodes 3, 4, which form together an almost complete ring, in which case each sub-electrode has the shape of a ring part, and consequently need not, for example, be square or rectangular.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A system for connecting a teat cup to a teat, comprising:
   at least one teat cup with an opening for receiving a teat;
   a robot arm, which is configured to move the teat cup;
   a teat cup positioning system with an optical 3D-sensor, which teat cup positioning system is configured to control the robot arm to connect the teat cup under the control of the optical 3D-sensor, wherein:
   the teat cup positioning system additionally comprises a sensor device for measuring a control quantity and is configured to control the robot arm to connect the teat cup under the control of the control quantity measured by the sensor device;
   wherein the sensor device comprises at least two electrodes and a capacitive sensor, wherein the electrodes are provided around the opening, and the capacitive sensor is configured to measure as the control quantity a quantity connected with the capacitance between the electrodes.

2. The system according to claim 1, wherein the measured control quantity is the capacitance between two electrodes.

3. The system according to claim 1, wherein the electrodes are disposed on at least one of an upper edge of the teat cup and on an upper edge of a liner in the teat cup.

4. The system according to claim 1, wherein the sensor device comprises a plurality of pairs of electrodes, wherein the electrodes of each pair are disposed in each case opposite one another around the opening, wherein the capacitive sensor is configured to measure a quantity connected with the capacitance between each pair of electrodes.

5. The system according to claim 4, wherein the measured control quantity is the capacitance between two electrodes.

6. The system according to claim 4, wherein the pairs of electrodes are disposed so as to be evenly distributed around the opening, and wherein the capacitive sensor is configured to measure the sum of the capacitances between each of the pairs of electrodes.

7. The system according to claim 1, wherein the teat cup positioning system is configured to control the robot arm under the maximization of the measured quantity.

8. The system according to claim 7, wherein the teat cup positioning system is configured to control the robot arm under the maximization of the capacitance.

9. The system according to claim 1, further comprising an animal recognition device.

10. The system according to claim 9, further comprising a data file containing previous teat positions.

11. A method for connecting a teat cup to a teat, the method comprising the steps of:
    providing a teat cup with an opening for receiving a teat,
    moving the teat cup in the vicinity of the teat via a robot arm,
    connecting a teat cup to the teat using a teat cup positioning system, wherein the teat cup positioning system has an optical 3D-sensor, which controls the teat cup positioning system, and wherein:
    the teat cup positioning system additionally comprises a sensor device for measuring a control quantity and controlling the robot arm to connect the teat cup under the control of the control quantity measured by the sensor device;
    wherein the sensor device comprises at least two electrodes and a capacitive sensor, wherein the electrodes are provided around the opening, and the capacitive sensor measures as the control quantity a quantity connected with the capacitance between the electrodes.

12. The method of claim 11, wherein the initial positioning of the teat cup takes place under the control of only the 3D-sensor, and wherein the final fine-positioning takes place under the control of the capacitive sensor device.

13. The method according to claim 11, wherein the measured control quantity is the capacitance between two electrodes.

14. The method according to claim 11, wherein the electrodes are disposed on at least one of an upper edge of the teat cup and on an upper edge of a liner in the teat cup.

15. The method according to claim 11, wherein the sensor device comprises a plurality of pairs of electrodes, wherein the electrodes of each pair are disposed in each case opposite one another around the opening, wherein the capacitive sensor is configured to measure a quantity connected with the capacitance between each pair of electrodes.

16. The method according to claim 11, wherein the measured control quantity is the capacitance between two electrodes.

17. The method according to claim 16, wherein the pairs of electrodes are disposed so as to be evenly distributed around the opening, and wherein the capacitive sensor is configured to measure the sum of the capacitances between each of the pairs of electrodes.

18. The method according to claim 1, wherein the teat cup positioning system controls the robot arm under the maximization of the measured quantity.

19. The method according to claim 18, wherein the teat cup positioning system controls the robot arm under the maximization of the capacitance.

20. The method according to claim 1, wherein the teat cup positioning system further comprises at least one of an animal recognition device and a data file containing previous teat positions.

* * * * *